United States Patent
Palmer et al.

(10) Patent No.: US 9,014,931 B2
(45) Date of Patent: Apr. 21, 2015

(54) SYSTEM AND METHOD FOR CONTROLLING A TRANSMISSION

(71) Applicant: Caterpillar Inc., Peoria, IL (US)

(72) Inventors: Thomas G. Palmer, Brimfield, IL (US); James H. DeVore, Metamora, IL (US)

(73) Assignee: Caterpillar, Inc., Peoria, IL (US)

(*) Notice: Subject to any disclaimer, the term of this patent is extended or adjusted under 35 U.S.C. 154(b) by 175 days.

(21) Appl. No.: 13/720,090

(22) Filed: Dec. 19, 2012

(65) Prior Publication Data
US 2014/0172253 A1    Jun. 19, 2014

(51) Int. Cl.
*G06F 7/00* (2006.01)
*B60W 10/11* (2012.01)

(52) U.S. Cl.
CPC ........................... *B60W 10/11* (2013.01)

(58) Field of Classification Search
None
See application file for complete search history.

(56) References Cited

U.S. PATENT DOCUMENTS

| | | | |
|---|---|---|---|
| 4,625,590 A | 12/1986 | Müller | |
| 4,731,727 A | 3/1988 | Rauch et al. | |
| 5,079,705 A | 1/1992 | Sakai et al. | |
| 5,406,862 A | 4/1995 | Amsallen | |
| 5,479,345 A | 12/1995 | Amsallen | |
| 5,510,982 A * | 4/1996 | Ohnishi et al. | 701/55 |
| 5,948,034 A | 9/1999 | Tihanyi et al. | |
| 6,061,623 A * | 5/2000 | Hippley et al. | 701/93 |
| 7,387,029 B2 * | 6/2008 | Cunningham | 73/781 |
| 7,499,784 B2 * | 3/2009 | Kresse | 701/61 |
| 2010/0082208 A1 | 4/2010 | Asai et al. | |
| 2011/0307166 A1 * | 12/2011 | Hiestermann et al. | 701/119 |
| 2012/0083980 A1 * | 4/2012 | Kresse et al. | 701/56 |
| 2013/0035829 A1 * | 2/2013 | Tiberg | 701/56 |

* cited by examiner

*Primary Examiner* — Helal A Algahaim
*Assistant Examiner* — Kelly E Darby
(74) *Attorney, Agent, or Firm* — Finnegan, Henderson, Farabow, Garrett & Dunner, LLP (57) ABSTRACT

A system for selecting shift schedules of a transmission of a vehicle configured to change gears according to two or more shift schedules includes a controller. The controller is configured to estimate mass of the vehicle based on a plurality of accelerations of the vehicle from a standstill, and estimate a road load of the vehicle based on the estimated mass. The controller is also configured to estimate a grade of terrain over which the vehicle is travelling based on the estimated mass of the vehicle. The controller is further configured to select between at least a first shift schedule and a second shift schedule based on at least one of the estimated mass of the vehicle, characteristics of the terrain over which the vehicle is travelling, the estimated grade of the terrain over which the vehicle is travelling, and functions capable of being performed by the vehicle.

18 Claims, 6 Drawing Sheets

SYSTEM AND METHOD FOR CONTROLLING A TRANSMISSION

TECHNICAL FIELD

The present disclosure relates generally to a system and method for controlling a transmission and, more particularly, to a system and method for selecting shift schedules of a transmission.

BACKGROUND

Vehicles may include a transmission coupled to an engine in order to provide more flexible use of the power output of the engine. The transmission may provide a number of gear ratios that enable the vehicle to travel at relatively wide range of speeds or conditions that might be impractical without a transmission. Some transmissions are configured to change gears automatically in order to improve the ease of operation of the vehicle as it is operated through its speed range.

The circumstances under which the transmission shifts gears may affect the efficiency of operation of the vehicle. For example, the time at which the transmission shifts gears and the gears selected by the transmission may result in operating the engine at more efficient engine speeds and power outputs. For example, in general, it is more efficient to operate an engine at relatively lower engine speeds for a given power output. However, under certain conditions, it may be preferable to operate an engine in a range of engine speeds that results in relatively higher engine performance at the expense of efficiency. For example, if the vehicle is heavily loaded and/or travelling up a relatively steep or long grade, it may be preferable for the transmission to select a gear that provides improved performance even if efficiency may suffer. As a result, it may be desirable to operate the transmission under certain conditions so that the efficiency of the vehicle is improved, while under other conditions, so that the performance of the vehicle is improved.

A method for selecting a shift schedule for a transmission in a motor vehicle is disclosed in U.S. Pat. No. 7,499,784 B2 to Kresse ("the '784 patent"). In particular, the method disclosed in the '784 patent includes the steps of determining whether a signal-to-noise ratio exceeds a threshold and calculating a tractive effort of the motor vehicle. The method thereafter includes estimating vehicle mass and road grade from the tractive effort using a recursive least squares estimator when the signal-to-noise ratio exceeds the threshold. When the signal-to-noise ratio does not exceed the threshold, vehicle mass is selected, and the road grade is estimated from the vehicle mass and tractive effort. Thereafter, the method includes selecting a shift schedule based on the vehicle mass and the estimated road grade.

Although the method disclosed in the '784 patent includes selecting a shift schedule based on estimations of the vehicle mass and road grade, the manner in which the estimations are carried out may suffer from a number of possible drawbacks. For example, the estimations may lack accuracy due, for example, to reliance on assumptions that are inaccurate. Therefore, it may be desirable to provide a system and method for controlling a transmission that selects shift schedules for the transmission in a more desirable manner.

SUMMARY

In one aspect, a system for selecting shift schedules of a transmission of a vehicle configured to change gears according to two or more shift schedules includes a controller. The controller is configured to estimate mass of the vehicle based on a plurality of accelerations of the vehicle from a standstill, and estimate a road load of the vehicle based on the estimated mass of the vehicle. The controller is also configured to estimate a grade of terrain over which the vehicle is travelling based on the estimated mass of the vehicle. The controller is further configured to select between at least a first shift schedule and a second shift schedule based on at least one of the estimated mass of the vehicle, characteristics of the terrain over which the vehicle is travelling, the estimated grade of the terrain over which the vehicle is travelling, and functions capable of being performed by the vehicle.

According to another aspect, a method of selecting shift schedules of a transmission of a vehicle configured to change gears according to two or more shift schedules, includes accelerating the vehicle from a standstill a plurality of times, and estimating mass of the vehicle based on the plurality of accelerations. The method further includes estimating a road load of the vehicle based on the estimated mass of the vehicle, and estimating a grade of terrain over which the vehicle is travelling based on the estimated mass of the vehicle. The method also includes selecting between at least a first shift schedule and a second shift schedule based on at least one of the estimated mass of the vehicle, characteristics of the terrain over which the vehicle is travelling, the estimated grade of the terrain over which the vehicle is travelling, and functions capable of being performed by the vehicle.

According to a further aspect, a vehicle includes a chassis, an engine coupled to the chassis, a transmission coupled to the engine and configured to change gears according to two or more shift schedules, and a controller. The controller is configured to estimate mass of the vehicle based on a plurality of accelerations of the vehicle from a standstill, and estimate a road load of the vehicle based on the estimated mass of the vehicle. The controller is also configured to estimate a grade of terrain over which the vehicle is travelling based on the estimated mass of the vehicle. The controller is further configured to select between at least a first shift schedule and a second shift schedule based on at least one of the estimated mass of the vehicle, characteristics of the terrain over which the vehicle is travelling, the estimated grade of the terrain over which the vehicle is travelling, and functions capable of being performed by the vehicle.

DETAILED DESCRIPTION

Figure 1:
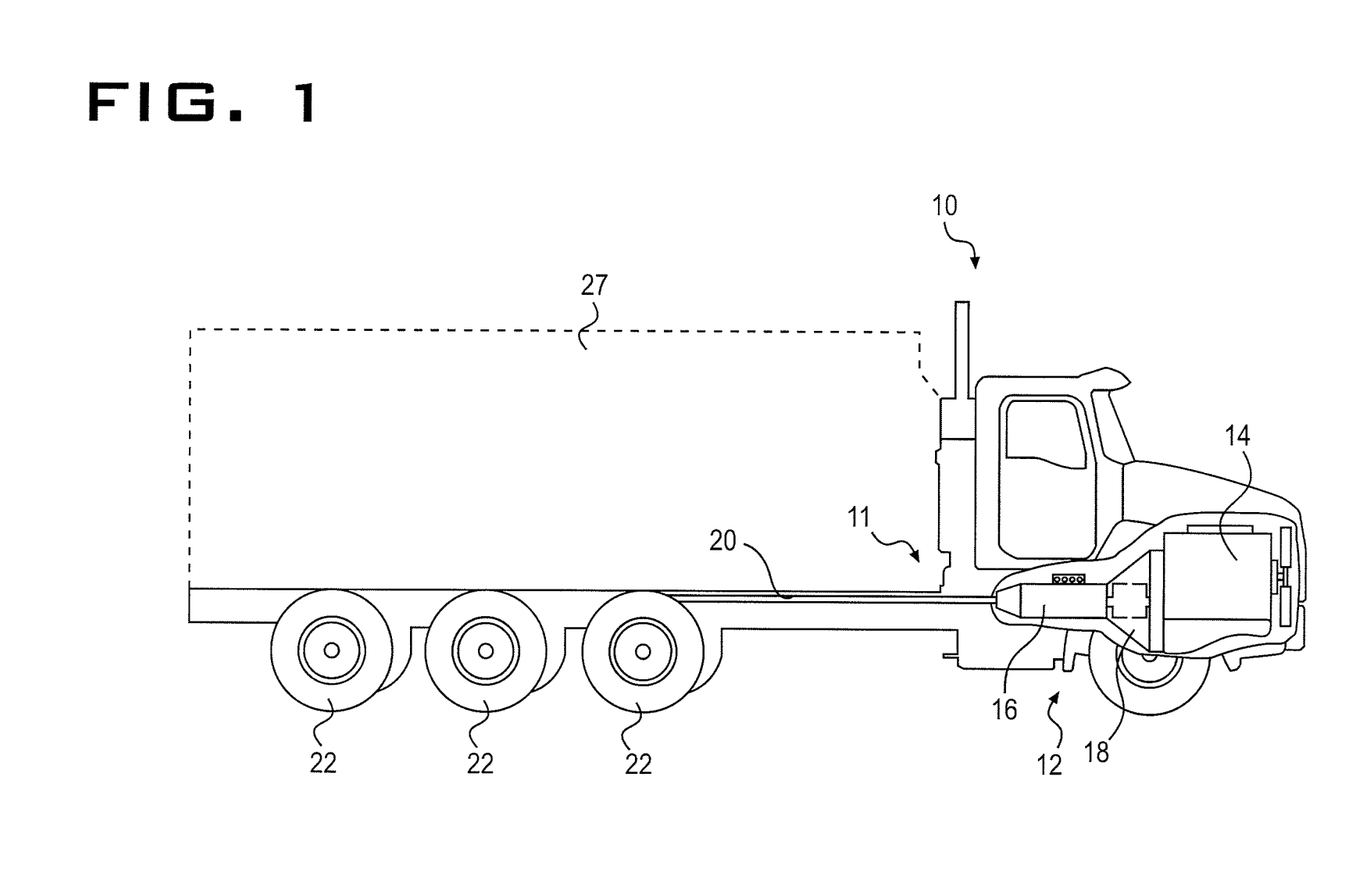
FIG. 1 is a schematic side view of an exemplary embodiment of a vehicle.

FIG. 1 shows an exemplary embodiment of a vehicle 10. Exemplary vehicle 10 shown in FIG. 1 is an on-highway truck. However, vehicle 10 may be a mobile machine that performs some type of operation associated with an industry, such as mining, construction, farming, transportation, or any other industry known in the art. For example, vehicle 10 may be a dump truck, a tandem dump truck, a tractor trailer truck, a tandem trailer truck, a refuse truck, an earth moving machine such as an off-highway haul truck, a wheel loader, a motor grader, or any other suitable earth moving machine. Vehicle 10 may alternatively be a passenger vehicle.

Figure 2:
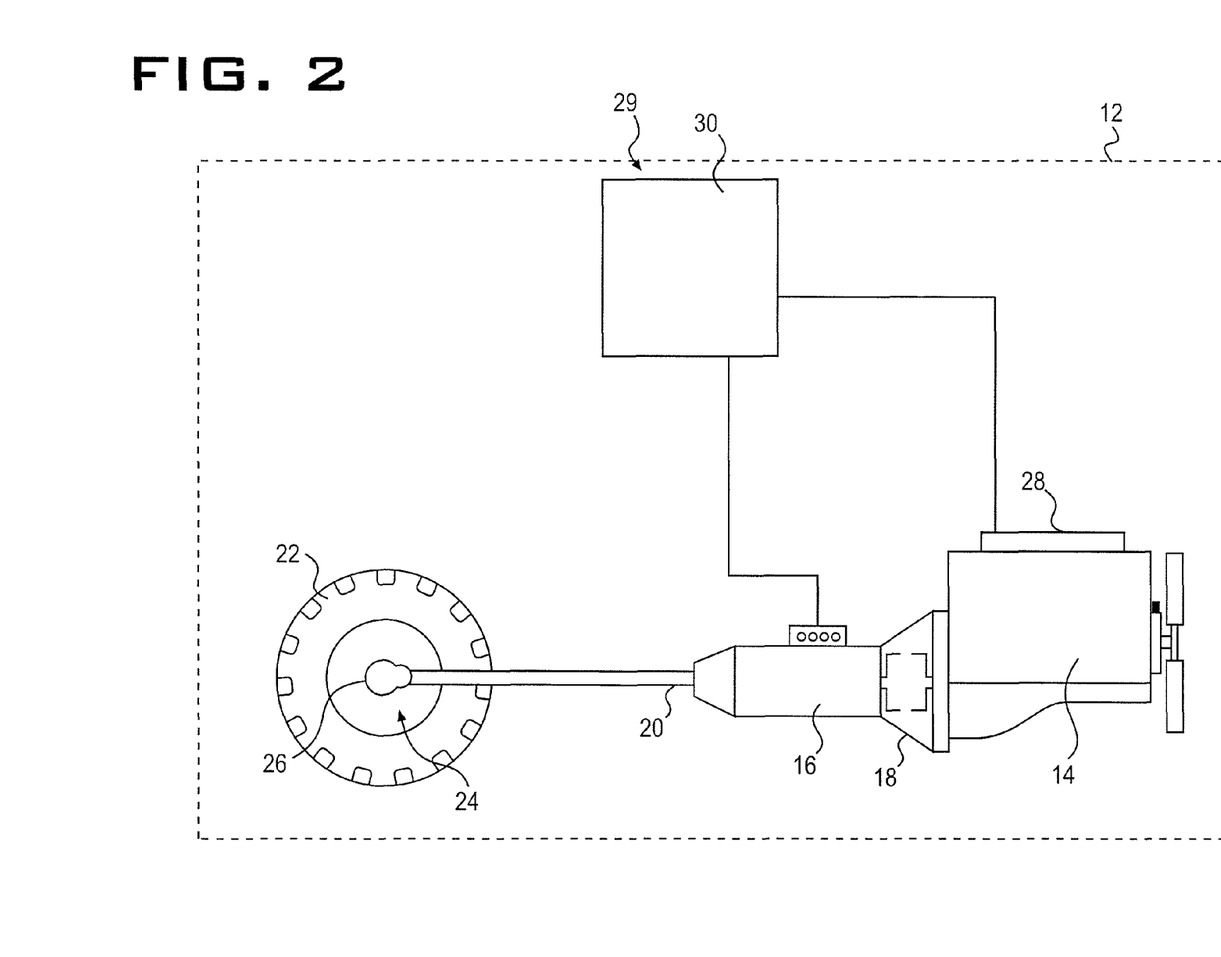
FIG. 2 is a schematic view of an exemplary embodiment of a powertrain.

Exemplary vehicle 10 includes a chassis 11 and a powertrain 12. As shown in FIGS. 1 and 2, exemplary powertrain 12 includes an engine 14 coupled to a transmission 16 via, for example, a torque converter 18. In particular, an output shaft (not shown) of engine 14 may be coupled to an input shaft (not shown) of torque converter 18, and an output shaft (not shown) of torque converter 18 may be coupled to an input shaft (not shown) of transmission 16. An output shaft (not shown) of transmission 16 may be coupled to a drive shaft 20, which, in turn, may be coupled to one or more traction devices 22 (e.g., wheels and/or ground engaging tracks) via a final drive 24 including, for example, a differential 26. As shown in FIG. 1, exemplary vehicle 10 includes a body 27. Body 27 may include, for example, a container, a tilting bed, or one or more trailers.

During operation of exemplary powertrain 12, engine 14 supplies rotational power to the input shaft of torque converter 18, which transfers the rotational power via its output shaft to the input shaft of transmission 16. Transmission 16 transfers the rotational power via its output shaft to drive shaft 20, which transfers the rotational power to traction devices 22 via final drive 24 and differential 26, thereby propelling exemplary vehicle 10.

Exemplary engine 14 may include any internal combustion engine, such as, for example, a compression-ignition engine, a spark-ignition engine, a gas turbine engine, a gaseous fuel-powered engine, or any other engines known to those skilled in the art. Alternatively, or in addition, engine 14 may include or be supplemented by a non-combustion source of power, such as, for example, an electric motor, a hydraulic motor, a fly-wheel-powered motor, a fuel cell, or any other known non-combustion source of power.

Exemplary torque converter 18 may be a hydro-mechanical device configured to couple engine 14 to transmission 16. For example, torque converter 18 may conduct pressurized fluid between the output shaft of engine 14 and the input shaft of transmission 16 to thereby drive transmission 16, while still allowing engine 14 to rotate independently of transmission 16 under certain circumstances. In addition, exemplary torque converter 18 may include a lockup clutch for directly, mechanically coupling the output shaft of engine 14 to the input shaft of transmission 16. In this exemplary arrangement, torque converter 18 may selectively absorb and multiply the torque transferred between engine 14 and transmission 16 by either allowing or preventing slippage between the output shaft rotation of engine 14 and the input shaft rotation of transmission 16. It is contemplated that torque converter 18 may alternatively include a non-hydraulic device, such as, for example, a mechanical diaphragm clutch.

Exemplary transmission 16 may include a number of components configured to interact and transmit power from engine 14 to drive shaft 20. For example, transmission 16 may include a multi-speed, bi-directional, mechanical transmission configured to provide a neutral gear, a plurality of forward gears, and one or more reverse gears, wherein the gears represent a ratio of the speed of the input shaft to the speed of the output shaft of transmission 16. For example, transmission 16 may include a plurality of planetary gear mechanisms (not shown) and a plurality of clutches (not shown) configured to interact to provide the neutral, forward, and reverse gears. The clutches may be selectively operated to interact with the combination of the components of the planetary gear mechanisms in a manner that results in desired gear ratios or neutral. Alternative types of transmissions known to those skilled in art are contemplated.

Exemplary transmission 16 may be an automatic transmission, where, for example, it is not necessary for the operator of exemplary vehicle 10 to initiate every change in the gears of transmission 16. For example, once an operator selects a mode of transmission operation (e.g., forward or reverse), transmission 16 will change gears without interaction of the operator.

According to some embodiments, changing gears of transmission 16 may be initiated based on one or more shift schedules configured to change gears based on one or more of, for example, throttle input, engine speed, vehicle mass, vehicle payload, road grade, and/or road load (e.g., resistance to motion based on parameters including, for example, aerodynamic drag, rolling resistance, and mechanical resistance), as explained in more detail herein. For example, operating transmission 16 according to different shift schedules may result in transmission 16 changing gears at different engine speeds in order to provide performance closely tailored to the current operating conditions of vehicle 10. According to some embodiments, gear changes may be based on other parameters.

Exemplary powertrain 12 may include a controller 28 configured to control operation engine 14, and a system 29 including a controller 30 configured to control operation of transmission 16. In the exemplary embodiment shown in FIG. 2, engine controller 28 and transmission controller 30 are separate from one another. However, it is contemplated that engine controller 28 and transmission controller 30 may be integrated into a single assembly or housing. Engine controller 28 may be configured to receive signals relating to operator inputs and/or from sensors associated with engine 14, and control operation of engine 14, including power output, torque output, and/or engine speed. Transmission controller 30 may be configured to control operation of transmission 16 based on signals relating to operator inputs, signals from sensors associated with engine 14, signals from engine controller 28, signals from torque converter 18 (e.g., the speed of the input shaft and/or output shaft of torque converter 18), as well as other sources associated with vehicle 10. In this exemplary manner, engine controller 28 and transmission controller 30 may operate in coordinated manner to control operation of powertrain 12, including engine 14 and transmission 16.

Engine controller 28 and/or transmission controller 30 may include a single microprocessor or multiple microprocessors configured to control operation of engine 12 and transmission 16, respectively. For example, engine controller 28 and/or transmission controller 30 may include one or more processors, microprocessors, central processing units, on-board computers, electronic control modules, and/or any other computing and control devices known to those skilled in the art. Engine controller 28 and/or transmission controller 30 may be configured run one or more software programs or applications stored in a memory location, read from a computer-readable medium, and/or accessed from an external device operatively coupled to engine controller 28 and transmission controller 30 by any suitable communications network. Various other known circuits may be associated with engine controller 28 and/or transmission controller 30, including power supply circuitry, signal-conditioning circuitry, solenoid driver circuitry, communication circuitry, and other appropriate circuitry.

Figure 3:
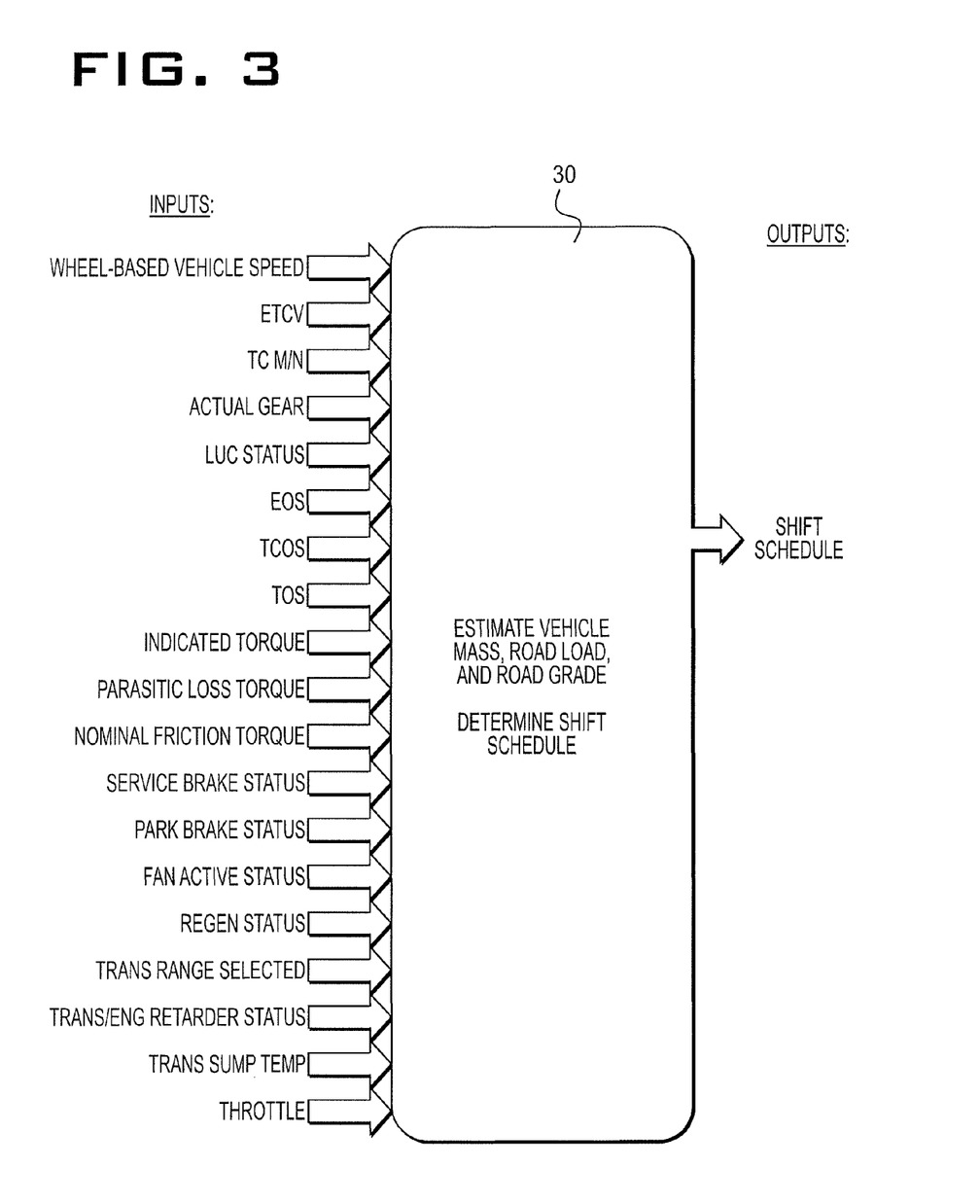
FIG. 3 is a schematic view of exemplary inputs and outputs of an exemplary embodiment of a system for selecting shift schedules of a transmission.

As shown in FIG. 3, transmission controller 30 may be configured to receive signals and select a shift schedule stored in transmission controller 30 (or accessible by transmission controller 30 via hard-wire link or wireless link) to control operation of transmission 16. A shift schedule may include a table, map, and/or equations (or correlations) of desired shift points of transmission 16 based on vehicle or powertrain conditions, such as, for example, the current gear, throttle position, and/or transmission output shaft speed. For example, a shift schedule may include information sufficient for transmission controller 30 to determine the engine speed at which transmission 16 changes gears for each of the gears and send signals to transmission 16 to initiate the change of gears. Different shift schedules may result in at least some of the gear changes occurring at different engine speeds relative to corresponding gear changes according to other shift schedules. For example, according to a first shift schedule, transmission controller 30 may initiate a change from a first gear to a second gear at a first engine speed (e.g., 3,000 rpm). In contrast, according to a second shift schedule, transmission controller 30 may initiate the change from the first gear to the second gear at a different engine speed (e.g., 2,500 rpm) lower than the engine speed at which the change from the first gear to the second gear is made according to the first shift schedule.

According to some embodiments, transmission controller 30 may be configured to initiate gear changes in transmission 16 according to a plurality of shift schedules tailored to different operating conditions of vehicle 10. For example, transmission controller 30 may be configured change gears according to a first shift schedule (e.g., a performance shift schedule) corresponding to higher performance of vehicle 10. Such a shift schedule may result in engine 14 operating at relatively higher engine speeds prior to changing to the next higher gear. This may be advantageous when, for example, vehicle 10 is carrying a higher payload, pulling a trailer, and/or operating on a relatively steep or lengthy grade or incline. By operating engine 14 at relatively higher engine speeds prior to changing to the next higher gear, vehicle 10 may exhibit improved performance as a result of engine 14 operating at consistently higher engine speeds, which may correspond more closely to higher torque and power output of engine 14.

According to some embodiments, transmission controller 30 may be configured to change gears according to a second shift schedule (e.g., an economy shift schedule) corresponding to a higher efficiency of operating vehicle 10. Such a shift schedule may result in engine 14 operating consistently at relatively lower engine speeds (i.e., relative to the performance shift schedule) prior to changing to the next higher gear. This may be advantageous when, for example, vehicle 10 is carrying a lighter payload and/or operating on relatively level terrain. By operating engine 14 at relatively lower engine speeds consistent with reduced fuel consumption prior to changing to the next higher gear, vehicle 10 may exhibit improved efficiency. According to some embodiments, transmission controller 30 may be configured to select from among more than two shift schedules. For example, transmission controller 30 may be configured to select from two or more performance shift schedules and/or two or more economy shift schedules.

As shown in FIG. 3, exemplary transmission controller 30 is configured to receive signals and select a shift schedule based on at least some of the received signals. The signals may be received from engine controller 28 and/or sensors (not shown) associated with various components of vehicle 10. According to some embodiments, transmission controller 30 is configured to receive the signals and estimate one or more of vehicle mass, road load (e.g., resistance to motion based on parameters including, for example, aerodynamic drag, rolling resistance, and mechanical resistance), and the grade of the terrain over which vehicle 10 is travelling. According to some embodiments, transmission controller 30 may select between at least a first shift schedule and a second shift schedule based on at least one of the estimated mass of the vehicle, characteristics of the terrain over which vehicle 10 is travelling, the estimated grade of the terrain over which vehicle 10 is travelling, and functions capable of being performed by vehicle 10.

For example, transmission controller 30 may be configured to select shift schedules based on one or more combinations of the estimated mass of the vehicle, characteristics of the terrain over which the vehicle is travelling, the estimated grade of the terrain over which the vehicle is travelling, and functions capable of being performed by the vehicle. According to some embodiments, transmission controller 30 may access a table or map correlating shift schedules to one or more of these parameters and select a shift schedule according to the correlations and signals indicative of the parameters.

For example, as explained in more detail herein, exemplary transmission controller 30 may be configured to estimate the mass of vehicle 10 using predetermined values (e.g., predetermined estimations) of the road load and the grade by holding the predetermined values constant and determining the estimated mass during a plurality of accelerations, for example, from a standstill. For example, transmission controller 30 may be configured to update the estimated mass of the vehicle by determining a running average of the estimated mass following each of the plurality of accelerations, and estimate the road load and grade based on the most recently updated mass estimation. Transmission controller 30 may update the estimated mass of the vehicle for a predetermined number of the plurality of accelerations and thereafter hold the updated mass estimation constant until transmission controller 30 detects a triggering event indicative of a change in the mass of the vehicle. For example, transmission controller 30 may update the estimated mass of the vehicle for four or more accelerations and thereafter hold the estimated mass at the running average determined following the four or more accelerations.

According to some embodiments, the triggering event indicative of a change in mass of vehicle 10 includes receipt by transmission controller 30 of signals indicative of, for example, at least one of a change in vehicle payload, disconnection of a trailer from vehicle 10, and connection of a trailer to vehicle 30. For example, signals indicative of a change in vehicle payload may include switching on and off of vehicle ignition, signals indicating that the parking brake has been activated for longer than a predetermined period of time (e.g., more than 180 seconds), signals indicating vehicle 10 has been stopped for more than a predetermined period of time (e.g., more than 210 seconds), loss of signals from other controllers and data sources of vehicle 10, signals indicating de-rating of engine 14, signals indicating a shift lever position for first gear in combination with a low vehicle speed (e.g., less than 7 mph) for more than a predetermined period of time (e.g., more than 80 seconds), signals indicative of simultaneous use of the throttle and brakes at a low vehicle speed (e.g., less than 7 mph) for more than a predetermined period of time (e.g., more than 80 seconds), and signals indicative of selection of neutral in transmission 16 for more than a predetermined period of time (e.g., more than 150 seconds). Such signals may be consistent with vehicle 10 functioning in a manner relating to changing loads, for example, receiving a load or dumping and/or spreading a load.

According to some embodiments, transmission controller 30 may be configured to select between at least a first shift schedule and a second shift schedule based at least partially on the characteristics of the terrain over which vehicle 10 is travelling. For example, transmission controller 30 may use the estimated grade to monitor the grade of the terrain over which vehicle 10 has travelled and select a shift schedule based on the grade of the highest magnitude traversed within a predetermined distance. For example, transmission controller 30 may be configured to select a performance shift schedule if vehicle 10 has travelled over rolling hills (e.g., hills having a minimum grade of 2-3%) within the last three miles.

According to some embodiments, transmission controller 30 may be configured to select between at least a first shift schedule and a second shift schedule based at least in part on the functions capable of being performed by vehicle 10. For example, the functions capable of being performed by the vehicle may include hauling a load, dumping a load, and hauling one or more trailers. Such functions may be associated with the following types of vehicles: a dump truck, a refuse truck, and tractor trailer-type trucks. According to some embodiments, transmission controller 30 may be configured to select shift schedules based in part of the type of vehicle.

According to some embodiments, transmission controller 30 may be configured to estimate the road load on vehicle 10, wherein the road load includes aerodynamic drag and rolling resistance associated with travel of vehicle 10. For example, transmission controller 30 may be configured to estimate the rolling resistance of vehicle 10 based on the estimated mass of vehicle 10. For example, transmission controller 30 may be configured to estimate the aerodynamic drag and/or rolling resistance associated with travel of the vehicle during coasting events, such as, for example, during off-throttle coasting of vehicle 10 following on-throttle travel or tractive efforts.

For example, similar to the manner in which the mass estimation may be updated based on a running average following a number of accelerations, road load estimations may be updated as the estimated mass is updated. Transmission controller 30 may update the estimated road load for a predetermined number of events (e.g., coasting events) and thereafter hold the updated road load estimation constant until transmission controller 30 detects a triggering event indicative of a change in the mass of the vehicle. For example, transmission controller 30 may update the estimated road load for four or more coasting events and thereafter hold the estimated road load at the running average determined following the four or more coasting events. According to some embodiments, a triggering event indicative of aerodynamic drag may include receipt by transmission controller 30 of signals indicative of, for example, a disconnection of a trailer from vehicle 10 or a connection of a trailer to vehicle 30. Such a triggering event may result in transmission controller 30 beginning a new estimation of road load due to the possible change in aerodynamic drag resulting from the removal or addition of a trailer to vehicle 10.

According to some embodiments, transmission controller 30 may be configured to be adjustable by the operator or vehicle fleet manager to select shift schedules based on vehicle mass and recent road grade characteristics. For example, transmission controller 30 may be configured to access tables or maps correlating the shift schedules and one or more parameters such as, the estimated mass of the vehicle, characteristics of the terrain over which the vehicle is travelling, the estimated grade of the terrain over which the vehicle is travelling, and functions capable of being performed by the vehicle. The operator or fleet manager, by adjusting an aggressiveness setting, may bias the shift schedule selection toward either an economy shift schedule or a power shift schedule, such that transmission controller 30 is more likely to select respective economy or power shift schedules for a given set of parameters. This may facilitate improving vehicle performance and fuel economy for a variety of vehicle applications, vehicle loading cycles, and terrain characteristics. For example, such adjustment may permit the operator or fleet manager to adjust how shift schedules are selected based on one or more of the following parameters: vehicle mass threshold (e.g., the minimum vehicle mass that triggers selection of a performance shift schedule), road grade threshold (e.g., the minimum road grade that triggers selection of a performance shift schedule), shift schedule responsiveness (e.g., how quickly shift schedules are permitted to change in response to changing parameters), and variation in available shift schedules (e.g., the number of available economy shift schedules).

As shown in FIG. 3, transmission controller 30 may be configured to receive one of more of the following signals: wheel-based vehicle speed (WHEEL-BASED VEHICLE SPEED), engine torque curve values (ETCV), torque converter model number (TC M/N), torque converter lock-up clutch status (LUC STATUS), current gear selected in transmission 16 (ACTUAL GEAR), engine speed (EOS), torque converter output speed (TCOS), transmission output shaft speed (TOS), current engine torque (INDICATED TORQUE), engine torque loss due to parasitic torque consumers (e.g., from fan and accessories) (PARASITIC LOSS TORQUE), nominal friction torque loss of engine at current speed (NOMINAL FRICTION TORQUE), service brake status (SERVICE BRAKE STATUS), parking brake status (PARKING BRAKE STATUS), engine fan status (FAN ACTIVE STATUS), status of exhaust particulate filter regeneration (REGEN STATUS), transmission range status (i.e., drive/neutral/reverse) (TRANS RANGE SELECTED), transmission retarder or engine brake status (i.e., percent retarder torque from transmission or engine retarder) (TRANS/ENG RETARDER STATUS), transmission sump temperature (TRANS SUMP TEMP), and accelerator pedal position (THROTTLE). As explained in more detail below, exemplary transmission controller 30 may be configured to use one or more of these signals to estimate the vehicle mass, road load, and/or road grade. Based on one or more of these estimations, transmission controller 30 may select a shift schedule for operation of transmission 16, as explained above. According to some embodiments, transmission controller 30 may use additional information to select a shift schedule.

According to some embodiments, transmission controller 30 may estimate the mass of the vehicle at lower vehicle speeds (e.g., speeds less than 10 mph), for example, during a number of accelerations from a standstill, so that aerodynamic drag and tractive force due to road grade can be estimated to approach zero according to the following exemplary process. Transmission controller 30 may pause a running average of the estimated vehicle mass upon receipt of signals indicative of a triggering event (e.g., an event indicative of a potential change in vehicle mass). For example, transmission controller 30 may hold the vehicle mass estimation constant if, for example, the service brake status indicates the service brake is being used, the transmission retarder or engine brake is active, the vehicle exhaust particulate filter is regenerating, the engine fan status indicates the engine fan is on, or a gear shift is in progress. Transmission controller 30 may thereafter determine the transmission input torque from, for example, a signal indicative of the transmission-to-torque converter speed ratio and torque converter tables, or signals indicative of the engine torque output from a vehicle bus message. Transmission controller 30 may thereafter estimate the vehicle mass using the transmission input torque and vehicle acceleration, which may be calculated based on the rate of change of vehicle speed. According to some embodiments, the estimated mass for each acceleration event may be averaged to determine a running average of estimated vehicle mass. This process of zeroing values, holding constant certain unknown values, and determining a running average during estimation calculations of unknowns (e.g., for vehicle mass) is sometimes referred to as a "hold-reset running average method."

Using an initially-estimated (or previously known) vehicle mass, the vehicle mass may be estimated based on one or more of the following equations:

$$m \cdot a = (T_e - J_e \cdot \alpha)/r_g - F_{fb} - F_{aero} - F_{grade} - F_{rollresist};$$

$$F_{rollresist} = m \cdot (0.005 + (4.1 + 0.041 \cdot v) \cdot 10^{-3})[\text{lbf}];$$

$$F_{grade} = m \cdot \sin(\tan^{-1}(G/100));$$

$$F_{aero} = \tfrac{1}{2} \cdot \rho \cdot v^2 \cdot d;$$

$$d = C_D \cdot A;$$

$$P_{tractive} = P_{Eng} - P_{DTLosses} - P_{aero} - P_{grade} - P_{rollresist};$$

$$P_{Eng} = T_e \cdot N/k;$$

$$P_{aero} = F_{aero} \cdot v/k;$$

$$P_{grade} = F_{grade} \cdot v/k;$$

and $$P_{rollresist} = F_{rollresist} \cdot v/k,$$

where $F_{fb}$ is the force on the vehicle due to vehicle braking or use of a retarder; $F_{aero}$ is the force on the vehicle due to aerodynamic drag; $F_{grade}$ is the force on the vehicle due to road grade; $F_{rollresist}$ is the force on the vehicle due to rolling resistance; $\alpha$ is the angular acceleration of the driveline at the transmission input; $T_e$ is the calculated transmission input torque; $J_e$ is the estimated rotational inertia of the powertrain; $r_g$ is the final drive ratio; a is the acceleration of the vehicle; m is the total mass of the vehicle; v is the current speed of the vehicle; G is the percent road grade; $\rho$ is a constant density of air at sea-level; d is the drag coefficient variable estimated during coasting events; N is the rotational speed of the engine; $C_D$ is the vehicle's drag coefficient, A is the vehicle's frontal area; $P_{tractive}$ is the available tractive effort power; $P_{Eng}$ is the transmission input power; $P_{DTLosses}$ is the total drivetrain power loss that can be estimated for the vehicle application and known drivetrain loss values; $P_{aero}$ is the power loss due to aerodynamic drag; $P_{grade}$ the power required to overcome the grade of the terrain on which the vehicle is travelling; $P_{rollresist}$ is the power required to overcome rolling resistance; and k is a constant (e.g., 375) that varies depending on the units used for the calculations.

According to some embodiments, if the estimated vehicle mass m is greater than a predefined threshold, transmission controller 30 may be configured to select a shift schedule that permits shifts to occur at a higher engine speed (e.g., according to a performance shift schedule). On the other hand, if the estimated vehicle mass m is less than the predefined threshold, transmission controller 30 may be configured to select a shift schedule that initiates shifts to a higher gear at a relatively lower engine speed (e.g., according to an economy shift schedule).

According to some embodiments, it may be desirable to reset the convergence of both the vehicle mass and the aerodynamic drag estimations if the vehicle is capable of connecting and disconnecting from a trailer (e.g., when the vehicle is a tractor-trailer truck). Therefore, it may be desirable for transmission controller to receive signals indicative connection and disconnection of the tractor to the trailer. As noted above, some embodiments may use signals indicative of directional shifts (e.g., signals indicative transmission shifts between a forward gear and a reverse gear), preceded or followed within a predetermined time period by signals indicative of a transmission shift to neutral as an indication that a trailer has been connected or disconnected to the tractor.

According to some embodiments, if the running average of the vehicle mass estimation stabilizes at a discrete value for a consecutive number of calculations, for example, such that the estimation is within plus or minus 5% in successive calculations, transmission controller 30 may thereafter hold the mass estimation value. According to some embodiments, transmission controller 30 may continue to recalculate the estimated mass by continuing to solve for the running average for certain vehicle conditions, for example, when the vehicle speed is below 10 mph. The most recent estimate of vehicle mass may thereafter be used in the above-noted equations for estimating aerodynamic drag and road grade. According to some embodiments, transmission controller 30 may continue to repeat the estimation recalculation for a number of accelerations until the estimated vehicle mass converges to within a predetermined estimate range or until a triggering event results in initiating a new round of mass estimate calculations, for example, if the parking brake is set. The predetermined estimate range may be such that the adjusted values of vehicle mass for a number of successive calculations is within about, for example, plus or minus 5%. Other estimate ranges are contemplated.

According to some embodiments, transmission controller 30 may be configured to use one or more of the following equations to estimate vehicle mass, road load, and/or road grade:

$$F = m \cdot a;$$

$$P_{tract} = (m \cdot a \cdot v)/k;$$

and $$P_{tract} = P_{wheel} - P_{roadload} - P_{grade},$$

where F is tractive force; m is vehicle mass; a is vehicle acceleration; k is a constant based on the units used in the equation (e.g. 375); $P_{tract}$ is tractive power; $P_{wheel}$ is the current available power at the traction devices (e.g., wheels), which may be calculated by subtracting powertrain power losses from the torque output from the engine, the transmission, and the lower powertrain, which may be provided from engine controller 28 or determined based on correlations (e.g., maps and/or equations, and/or estimates based on the type or use of the vehicle) relating engine torque, engine speed, and/or throttle setting. $P_{roadload}$ may include the power required to overcome resistance to motion based on parameters including, for example, aerodynamic drag, rolling resistance, and mechanical resistance such as friction. $P_{grade}$ is the power required to overcome the grade of the terrain on which the vehicle is travelling.

An equation for determining tractive force F is as follows:

$$m \cdot a = (T_e - (J_e \cdot \alpha))/r_g) - F_{fb} - F_{aero} - F_{rollresist} - F_{grade},$$

where m is the mass of the vehicle; a is the acceleration of the vehicle, $T_e$ is the engine torque at the flywheel; $J_e$ is the input powertrain inertia; $\alpha$ is the rotational acceleration at the transmission; $r_g$ is the total gear ratio at the traction devices; $F_{fb}$ is the force from braking, which may be assumed to be zero when, for example, the service brake and retarder status broadcast on the vehicle bus indicates that the service brake and the retarding devices are inactive); $F_{aero}$ is the force of aerodynamic drag on the vehicle; $F_{rollresist}$ is the rolling resistance force on the vehicle; and $F_{grade}$ is the force resulting from the grade of the terrain on which the vehicle is traveling.

According to some embodiments, one or more of the equations above may be used by transmission controller 30 to estimate the mass m of vehicle 10. For example, the vehicle mass may be estimated at low speeds, for example, speeds below 10 mph. At such speeds, the road grade may be assumed to be equal to about zero, and the aerodynamic drag $F_{aero}$ may be assumed to approach zero. It may be assumed the braking force is equal to zero, and the rolling resistance may be estimated to be about 0.02 multiplied by the vehicle mass m or using an equation previously defined.

According to some embodiments, the road load may be estimated during zero throttle coasting events, for example, immediately following a tractive event at higher vehicle speeds (e.g., at speeds of 45 mph or greater), or during deceleration of the vehicle by holding the current road grade estimate constant. For example, the following equation may be used to estimate road load as a function of vehicle speed:

$$P_{roadload} = m \cdot (-a) \cdot (v/k) = P_{chargepump} + P_{transmloss} + P_{DTloss} + P_{rollresist} + P_{aero} + P_{grade} + (\tau_{nomfriction} - \tau_{parasitic}) \cdot N/c,$$

where $P_{roadload}$ includes the power loss due to the road load on vehicle 10; m is vehicle mass; a is the rate of vehicle deceleration; v is vehicle speed; k is a constant (e.g., 375) based on the units used in the equation; $P_{chargepump}$ includes the power loss due to operation of a pump used to provide lubrication to the transmission; $P_{transmloss}$ includes the power loss due to friction and heat in transmission; $P_{DTloss}$ includes the power loss due to friction and heat in the final drive and differential; $\tau_{nomfriction}$ includes the nominal friction torque of the engine without parasitic losses; $\tau_{parasitic}$ includes parasitic torque losses associated with operation of the engine; N is the engine speed; and c is a constant (e.g., 5252) based on the units used in the equation.

According to some embodiments, this equation may be used to estimate the power loss associated with the road load (e.g., including power loss due to resistance to motion based on parameters including, for example, aerodynamic drag, rolling resistance, and mechanical resistance). For example, transmission controller 30 may be configured to collect data associated with vehicle speed and the rate of vehicle deceleration for a number of data points and correlate the deceleration rate with the vehicle speed. For example, transmission controller 30 may collect data at the following exemplary vehicle speed ranges: 9-10 mph; 19-20 mph; 29-30 mph; 39.5-40.5 mph, 49.5-50.5 mph. Other vehicle speed ranges are contemplated. Following collection of the coasting event data, transmission controller 30 may correlate vehicle deceleration rates with vehicle speed. Based on the estimated vehicle mass, deceleration rates, and vehicle speed, the road load may be estimated using the equation above and determining the best match among, for example, three or more common road load curves corresponding to the use or type of vehicle. According to some embodiments, transmission controller 30 may use the correlations to estimate the road load while holding the current road grade estimation constant.

According to some embodiments, transmission controller 30 may be configured to estimate the road grade based on one or more of the following equations:

$$P_{grade} = P_{wheel} - P_{tract} - P_{roadload};$$

and $$P_{tract} = m \cdot a \cdot (v/k),$$

where $P_{grade}$ includes the power loss due to the grade of the terrain on which the vehicle is travelling; $P_{tract}$ includes the tractive power; $P_{wheel}$ includes the power available at traction devices 22 (e.g., wheels); $P_{roadload}$ includes the power loss due to the road load; m is the vehicle mass; a is the vehicle acceleration; v is the vehicle speed; and k is a constant (e.g., 375) based on the units used in the equation. During acceleration of the vehicle, the power input into transmission 16 may be determined based on information received from the engine controller or based on sensed information relating to the input and/or output of the torque converter. The power available at the traction devices may be calculated by subtracting estimated powertrain losses from the torque output of the engine, which may be obtained either from the engine controller or based on signals from sensors associated with the powertrain. Using estimates of the vehicle mass and road load, the road grade may be estimated based on the equations above.

According to some embodiments, transmission controller 30 may be configured to determine the transmission input torque $T_e$ from a torque converter table or torque map based on input and output speeds, or by calculating engine output torque from vehicle bus messages based on the following equations:

$$T_e = (\tau_{indicated} - \tau_{nomfriction} - \tau_{parasitic})$$

(i.e., when the torque converter lock-up clutch is engaged); and $$T_e = R_c \cdot T_p'$$

(i.e., when the torque converter is in converter drive mode), where $R_c$ is the torque converter ratio based on correlations from torque converter maps; and $T_p'$ is the primary torque based on correlations from torque converter maps.

INDUSTRIAL APPLICABILITY

The disclosed system and method for selecting shift schedules may be used with any vehicle having a transmission configured to change gears according to two or more shift schedules, which provide the shift points (e.g., the engine speeds at which gear changes occur) for changing gears of the transmission. The different shift schedules may provide desirable operational characteristics for the vehicle in different operating conditions.

For example, it may be desirable for the transmission to change gears in a manner that provides improved efficiency. Under such conditions, it may be desirable for transmission 16 to change gears according to a shift schedule that results in engine speed being relatively low when gear changes occur. According to such an economy shift schedule, engine 14 operates at consistently lower engine speeds resulting in improved fuel efficiency. However, under different operating conditions, it may be desirable to operate transmission 16 according to a shift schedule that results in engine 14 consistently operating at relatively higher engine speeds that correspond to higher power output. As a result, according to a performance shift schedule, the shift points result in engine 14 operating at higher engine speeds prior to initiating a gear change. According to some embodiments of the disclosed system and method for selecting shift schedules, the system and method may result in transmission controller 30 automatically selecting a shift schedule from two or more shift schedules that results in desirable operation of transmission 16 based on the operating conditions associated with vehicle 10.

Figure 4:
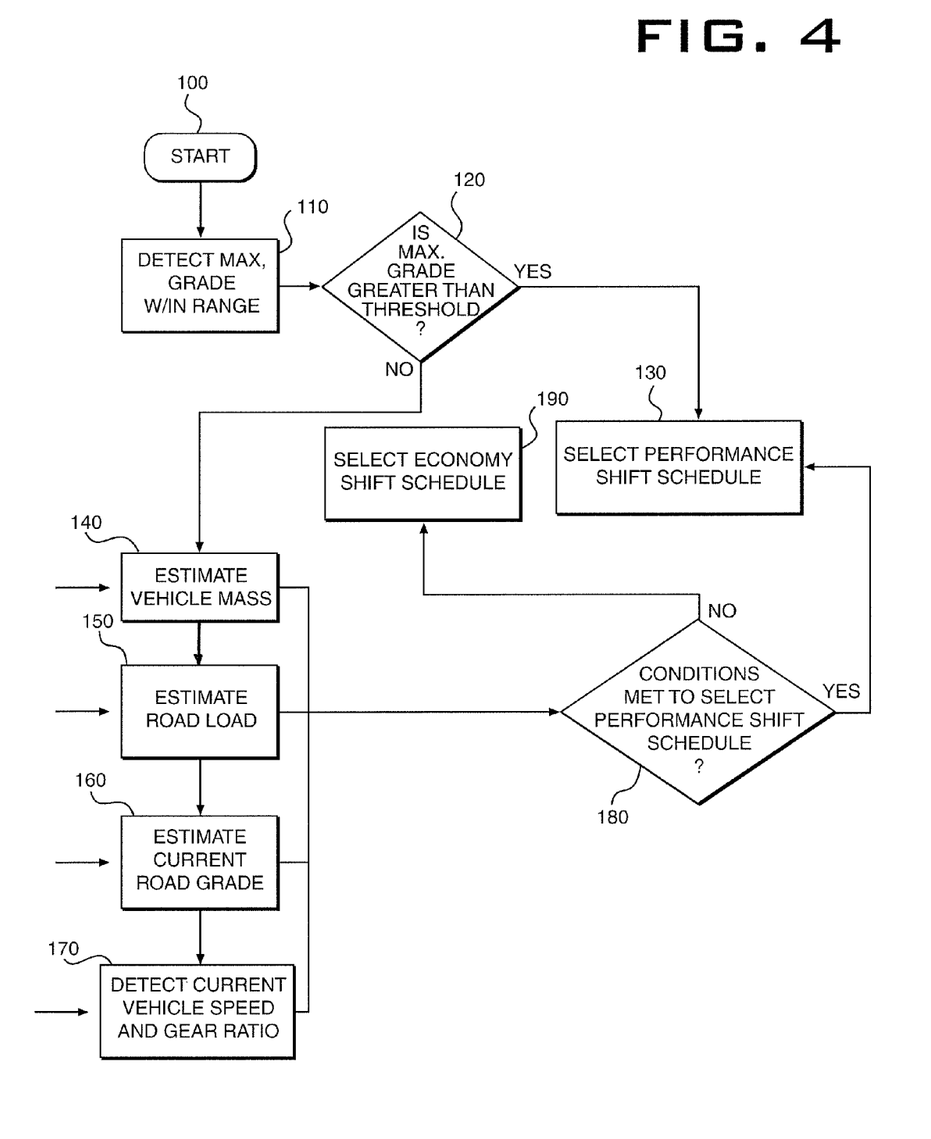
FIG. 4 is a flow chart depicting an exemplary method of selecting shift schedules of a transmission.

FIG. 4 shows a flow chart of an exemplary embodiment of a method for selecting a shift schedule. According to the exemplary embodiment shown in FIG. 4, the method begins at the start 100. Upon starting, at step 110, system 29 may detect the maximum road grade of terrain within a certain range over which vehicle 10 has travelled (e.g., grades greater than 2-3% within the last two miles travelled). According to some embodiments, the grade may be based on road grade estimations by transmission controller 30. According to some embodiments, transmission controller 30 may be configured to receive signals that provide maximum road grade information based on the current location of vehicle 10 (e.g., from electronic map programs).

At step 120, transmission controller 30 may compare the maximum road grade with a predetermined road grade value such as, for example, 2-3%. If the maximum road grade is greater than the predetermined road grade value, at step 120 transmission controller 30 may select a performance shift schedule at step 130, which results in allowing engine 14 to achieve higher engine speeds prior to transmission 16 changing to the next higher gear. However, if at step 120, the maximum road grade is less than or equal to the predetermined road grade, at step 140, transmission controller 30 may begin a process for determining whether an economy shift schedule may be selected. For example, at step 140 transmission controller 30 may estimate the vehicle mass according to the methods described previously herein and as explained below with respect to FIGS. 5 and 6, which are flow charts depicting an exemplary method of estimating vehicle mass, road load, and grade using an exemplary hold-reset running average method.

After transmission controller 30 has estimated the vehicle mass, transmission controller 30 may estimate road load at step 150 and estimate current road grade at step 160 according to the methods described previously herein and described with respect to FIGS. 5 and 6. At step 170, which does not necessarily follow steps 140-160, transmission controller 30 may receive signals indicative of the current vehicle speed and the gear selected in transmission 16.

Following steps 140-170, at step 180 transmission controller 30 may determine whether the estimates and conditions are met for selecting a performance shift schedule rather than an economy shift schedule. For example, transmission controller 30 may select shift schedules based on one or more combinations of the estimated mass of the vehicle, characteristics of the terrain over which the vehicle is travelling, the estimated grade of the terrain over which the vehicle is travelling, and functions capable of being performed by the vehicle. According to some embodiments, transmission controller 30 may access a table or map correlating shift schedules to one or more of these parameters and select a shift schedule according to the correlations and signals indicative of the parameters. If transmission controller 30 determines that the conditions are not met for selecting a performance shift schedule, at step 190 transmission controller 30 selects an economy shift schedule. Alternatively, if transmission controller 30 determines that the conditions are met for selecting a performance shift schedule, then at step 130 transmission controller selects a performance shift schedule. Examples of conditions that might result in transmission controller 30 selecting a performance shift schedule include determining that the terrain includes hills having a grade greater than 2% within the last 3 miles travelled, estimating a vehicle mass of greater than 40,000 lbs., estimating a current road grade of greater than 2%, and/or receiving a signal indicating that the vehicle is a dump truck.

Figure 5:
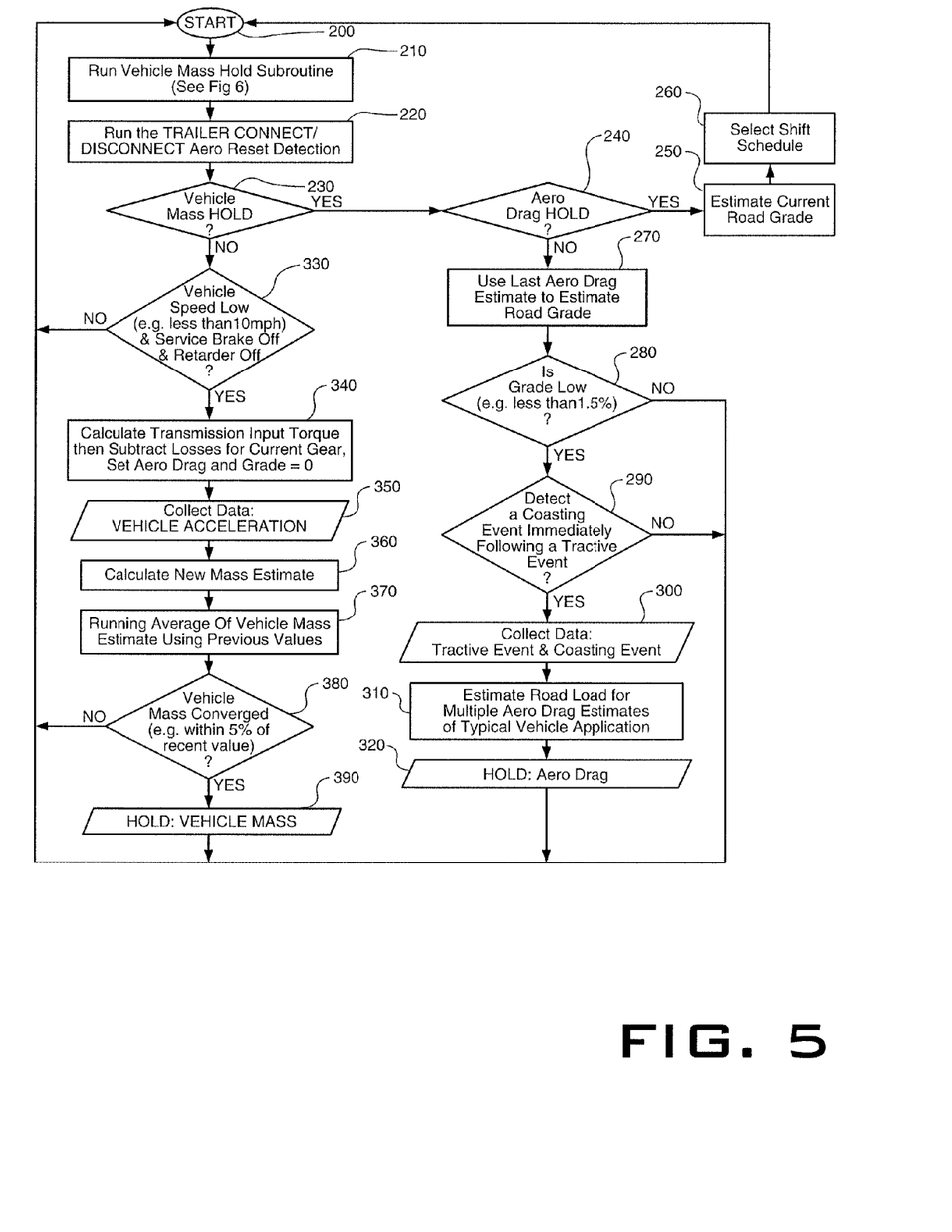
FIG. 5 is a flow chart depicting an exemplary method of estimating vehicle mass, road load, and grade using a hold-reset running average method.
Figure 6:
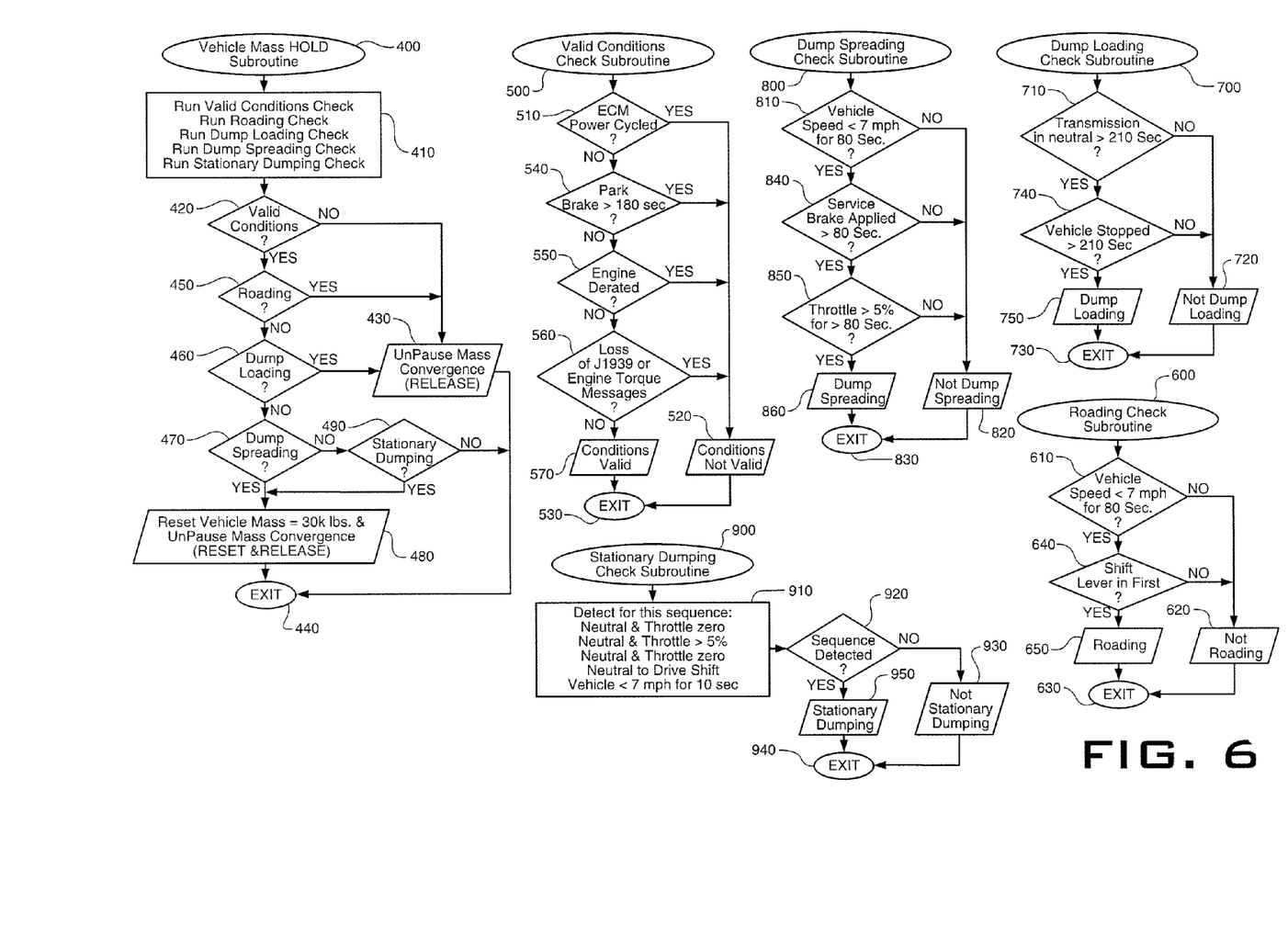
FIG. 6 shows exemplary flow charts for an exemplary embodiment of a vehicle mass hold subroutine.

FIGS. 5 and 6 are flow charts illustrating an exemplary method of estimating vehicle mass, road load, and grade using a hold-reset running average method. According to this exemplary method, running averages for vehicle mass and road load are determined by transmission controller 30, the determined vehicle mass and road load are held constant following a predetermined number of running average calculations or following a determination that the running average calculations are converging at respective single values of vehicle mass and road load within a predetermined range. These estimations are held constant until transmission controller 30 detects a triggering event as described above and/or according to exemplary steps shown in FIGS. 5 and 6. Upon determination of a triggering event, transmission controller 30 calculates new estimations of vehicle mass and road load.

For example, as shown in FIG. 5 transmission controller 30 at step 200 starts the exemplary hold-reset running average routine. At step 210, transmission controller 30 begins a vehicle mass hold subroutine 400 (see FIG. 6) as explained in more detail below. Following step 210, at step 220 transmission controller 30 runs a trailer connect/disconnect aero reset subroutine to determine whether a trailer has been connected to or disconnected from vehicle 10. At step 230, based on the results of the hold-reset running average subroutine 400 and the aero reset subroutine at step 220, transmission controller 30 determines whether the estimated vehicle mass should be held constant. If so, at step 240 transmission controller 30 determines whether the aerodynamic drag estimation should be held constant (e.g., based on a convergence of running average estimations). If so, at step 250 transmission controller 30 estimates the current road grade based on the vehicle mass and road load estimations, and at step 260 selects a shift schedule as described previously herein. Thereafter, transmission controller 30 returns to step 200 and restarts the exemplary hold-reset running average routine.

However, if at step 240 transmission controller 30 determines that the aerodynamic drag estimate should not be held constant, at step 270 transmission controller 30 uses the most recent aerodynamic drag estimate to estimate road grade as described previously herein. At step 280, transmission controller 30 estimates the road grade and if the road grade is low, for example, less than 1.5%, at step 290 transmission controller 30 determines whether a coasting event following a tractive event has occurred. If not, transmission controller 30 returns to step 200 to restart the exemplary hold-reset running average routine. However, if transmission controller 30 determines that a coasting event following a tractive event has occurred, at step 300 transmission controller 30 collects data associated with the coasting and tractive events and at step 310 estimates the road load for multiple aerodynamic drag estimates for a typical vehicle application, for example, as described previously herein. After estimating the road load using multiple aerodynamic drag estimates, at step 320 transmission controller 30 holds the aerodynamic drag estimate constant until transmission controller 30 detects a triggering event.

If at step 230, transmission controller 30 determines that the vehicle mass should not be held constant, transmission controller 30 begins to recalculate the vehicle mass estimate at step 330 by determining whether vehicle 10 is travelling less than 10 mph and whether the service brake and engine retarder are off. If not, transmission controller 30 returns to step 200 and restarts the routine. If so, at step 340 transmission controller 30 determines the transmission input torque, subtracts power losses due to the current gear selected in transmission 16, and sets the aerodynamic drag and current road grade to zero in order to begin estimating the vehicle mass as described above. Thereafter, at step 350 transmission controller 30 begins collecting data associated with acceleration of vehicle 10, for example, from a standstill. Acceleration data may also be collected during negative acceleration (i.e., during deceleration). At step 360, based on such acceleration and associated data, transmission controller 30 determines a new vehicle mass estimation. Based on a plurality of such accelerations and data collections, at step 370 transmission controller 30 determines a running average of the mass estimations to converge on a single estimation of vehicle mass. For example, at step 380 transmission controller 30 determines whether the vehicle mass estimation has converged, for example, such that successive estimations are within a predetermined range of one another (e.g., within 5% of one another). If the vehicle mass estimation has converged, at step 390 transmission controller 30 may hold the converged mass estimation constant until transmission controller 30 detects a triggering event for resetting the vehicle mass. If the vehicle mass estimation has not converged, then transmission controller 30 returns to step 200 and restarts the hold-reset running average routine.

FIG. 6 is a flow chart of an exemplary method for determining triggering events for recalculating vehicle mass, road load, and/or road grade estimates using exemplary vehicle mass hold subroutine 400. For example, beginning at step 410, transmission controller 30 runs a number of subroutines to determine whether the current vehicle mass estimate should be held constant or reset according to new calculations. For example, at step 420 transmission controller 30 runs a valid conditions check subroutine 500, as explained in more detail below. If transmission controller 30 determines that conditions are not valid, at step 430 transmission controller 30 releases the mass estimation, and at step 440 exits vehicle mass subroutine 400 and returns to step 210 (see FIG. 5) to continue the hold-reset running average routine.

However, if at step 420 transmission controller 30 determines that conditions are valid, at step 450 transmission controller 30 runs a roading check subroutine 600, as explained in more detail below. If transmission controller 30 determines that vehicle 10 is roading, at step 430 transmission controller 30 releases the mass estimation, and at step 440 exits vehicle mass subroutine 400 and returns to step 210 (see FIG. 5) to continue the hold-reset running average routine.

If at step 450 transmission controller 30 determines that vehicle 10 is not roading, at step 460 transmission controller 30 runs a dump loading check subroutine 700, as explained in more detail below. If transmission controller 30 determines that vehicle 10 is dump loading, at step 430 transmission controller 30 releases the mass estimation, and at step 440 exits vehicle mass subroutine 400 and returns to step 210 to continue the hold-reset running average routine.

If at step 460 transmission controller 30 determines that vehicle 10 is not dump loading, at step 470 transmission controller 30 runs a dump spreading check subroutine 800, as explained in more detail below. If transmission controller 30 determines that vehicle 10 is not dump spreading, at step 490 transmission controller 30 runs a stationary dumping check subroutine 900, as explained in more detail below. If at step 490, transmission controller 30 determines that vehicle 10 is not stationary dumping, transmission controller 30 at step 440 exits vehicle mass subroutine 400 and returns to step 210 (see FIG. 5) to begin a new vehicle mass estimation. If at step 490, transmission controller 30 determines that vehicle 10 is stationary dumping, at step 480 transmission controller 30 resets the vehicle mass estimation to a predetermined value (e.g., 30,000 lbs.), releases the mass convergence, and at step 440 exits the vehicle mass subroutine 400 and returns to step 210 (see FIG. 5) to continue the hold-reset running average routine.

As noted above, exemplary vehicle mass subroutine 400 may include valid conditions check subroutine 500. In exemplary valid conditions check subroutine 500, transmission controller 30 at step 510 determines whether engine control module (ECM) power has cycled. If so, at step 520 transmission controller 30 determines that conditions are not valid, and at step 530 exits valid conditions check subroutine 500 and returns to step 420 of vehicle mass hold subroutine 400.

If on the other hand, transmission controller 30 determines that ECM power has cycled, at step 540 transmission controller 30 determines whether the parking brake has been active for a predetermined period of time (e.g., more than 180 seconds). If so, at step 520 transmission controller 30 determines that conditions are not valid, and at step 530 exits valid conditions check subroutine 500 and returns to step 420 of vehicle mass hold subroutine 400.

However, if transmission controller 30 determines that the parking brake has not been active for a predetermined period of time, at step 550 transmission controller 30 determines whether engine 14 has been derated. If so, at step 520 transmission controller 30 determines that conditions are not valid, and at step 530 exits valid conditions check subroutine 500 and returns to step 420 of vehicle mass hold subroutine 400.

However, if transmission controller 30 determines that engine 14 has not been derated, at step 560 transmission controller 30 determines whether signals from J1939 have been lost or whether signals of engine torque have been lost. If so, at step 520 transmission controller 30 determines that conditions are not valid, and at step 530 exits valid conditions check subroutine 500 and returns to step 420 of vehicle mass hold subroutine 400. If not, at step 570 transmission controller 30 determines that conditions are valid, and at step 530 exits valid conditions check subroutine 500 and returns to step 420 of vehicle mass hold subroutine 400.

As noted above, exemplary vehicle mass subroutine 400 may include roading check subroutine 600. In exemplary roading check subroutine 600, transmission controller 30 at step 610 determines whether the speed of vehicle 10 is less than a predetermined speed (e.g., less than 7 mph) for greater than a predetermined time period (e.g., greater than 80 seconds). If not, at step 620 transmission controller 30 determines that vehicle 10 is not roading, and at step 630 exits roading check subroutine 600 and returns to step 450 of vehicle mass hold subroutine 400.

However, if transmission controller 30 determines that the speed of vehicle 10 is not less than a predetermined speed for greater than a predetermined time period, at step 640 transmission controller 30 determines whether first gear has been selected in transmission 16. If not, at step 620 transmission controller 30 determines that vehicle 10 is not roading, and at step 630 exits roading check subroutine 600 and returns to step 450 of vehicle mass hold subroutine 400. If transmission controller 30 determines that first gear has been selected in transmission 16, at step 650 transmission controller 30 determines that vehicle 10 is roading, and at step 630 exits roading check subroutine 600 and returns to step 450 of vehicle mass hold subroutine 400.

As noted above, exemplary vehicle mass subroutine 400 may include dump loading check subroutine 700. In exemplary dump loading check subroutine 700, at step 710 transmission controller 30 determines whether transmission 16 has been in neutral for more than a predetermined time period (e.g., greater than 210 seconds). If not, at step 720 transmission controller 30 determines that vehicle 10 is not dump loading, and at step 730 exits dump loading check subroutine 700 and returns to step 460 of vehicle mass hold subroutine 400. If so, transmission controller 30 at step 740 determines whether vehicle 10 has been stopped for greater than a predetermined time period (e.g., greater than 210 seconds). If not, at step 720 transmission controller 30 determines that vehicle 10 is not dump loading, and at step 730 exits dump loading check subroutine 700 and returns to step 460 of vehicle mass hold subroutine 400. If so, at step 750 transmission controller 30 determines that vehicle 10 is dump loading, and at step 730 exits dump loading check subroutine 700 and returns to step 460 of vehicle mass hold subroutine 400.

As noted above, exemplary vehicle mass subroutine 400 may include dump spreading check subroutine 800. In exemplary dump spreading check subroutine 800, at step 810 transmission controller 30 determines whether the speed of vehicle 10 is less than a predetermined speed (e.g., less than 7 mph) for greater than a predetermined time period (e.g., greater than 80 seconds). If not, at step 820 transmission controller 30 determines that vehicle 10 is not dump spreading, and at step 830 exits dump spreading check subroutine 800 and returns to step 470 of vehicle mass hold subroutine 400.

However, if transmission controller 30 determines that the speed of vehicle 10 is not less than a predetermined speed for greater than a predetermined time period, at step 840 transmission controller 30 determines whether the service brake has been applied for more than a predetermined time period (e.g., greater than 80 seconds). If not, at step 820 transmission controller 30 determines that vehicle 10 is not dump spreading, and at step 830 exits dump spreading check subroutine 800 and returns to step 470 of vehicle mass hold subroutine 400.

If transmission controller 30 determines that the service brake has been applied for more than a predetermined time period, at step 850 transmission controller 30 determines whether the throttle has been at a setting greater than a predetermined setting (e.g., greater than 5%) for a predetermined time period (e.g., 80 seconds). If not, at step 820 transmission controller 30 determines that vehicle 10 is not dump spreading, and at step 830 exits dump spreading check subroutine 800 and returns to step 470 of vehicle mass hold subroutine 400. If so, transmission controller 30 at step 860 determines that vehicle 10 is dump spreading, and at step 830 exits dump spreading check subroutine 800 and returns to step 470 of vehicle mass hold subroutine 400.

As noted above, exemplary vehicle mass subroutine 400 may include stationary dumping check subroutine 900. In exemplary stationary dumping subroutine 900, at step 910 transmission controller 30 determines whether the following exemplary predetermined sequence of throttle setting, transmission setting, and/or vehicle speed has occurred: (1) transmission 16 in neutral with zero throttle; (2) transmission 16 in neutral with throttle greater than a predetermined setting (e.g., greater than 5%); (3) transmission 16 in neutral with zero throttle; (4) transmission shifts from neutral to drive; and (5) vehicle 10's speed is less than a predetermined speed (e.g., less than 7 mph) for a predetermined time period (e.g., 10 seconds).

At step 920, transmission controller 30 determines whether this exemplary sequence has been detected. If not, at step 930 transmission controller 30 determines that vehicle 10 is not stationary dumping, at step 940 exits stationary dumping check subroutine 900, and returns to step 490 of vehicle mass hold subroutine 400. If so, transmission controller 30 at step 950 determines that vehicle 10 is stationary dumping, at step 940 exits stationary dumping check subroutine 900, and returns to step 490 of vehicle mass hold subroutine 400.

It will be apparent to those skilled in the art that various modifications and variations can be made to the exemplary disclosed systems, methods, and vehicle. Other embodiments will be apparent to those skilled in the art from consideration of the specification and practice of the exemplary disclosed embodiments. It is intended that the specification and examples be considered as exemplary only, with a true scope being indicated by the following claims and their equivalents.

What is claimed is:

1. A system for selecting shift schedules of a transmission of a vehicle configured to change gears according to two or more shift schedules, the system comprising:
 a controller configured to:
  estimate a mass of the vehicle based on a plurality of accelerations of the vehicle from a standstill;
  estimate a road load of the vehicle based on the estimated mass of the vehicle;
  estimate a grade of terrain over which the vehicle is travelling based on the estimated mass of the vehicle; and
  select between at least a first shift schedule and a second shift schedule based on at least one of the estimated mass of the vehicle, characteristics of the terrain over which the vehicle is travelling, the estimated grade of the terrain over which the vehicle is travelling, and functions capable of being performed by the vehicle,
 wherein the controller is configured to estimate the mass of the vehicle using predetermined values of the road load and the grade by holding the predetermined values constant and determining the estimated mass during the plurality of accelerations.

2. The system of claim 1, wherein the controller is configured to update the estimated mass of the vehicle by determining a running average of the estimated mass following each of the plurality of accelerations, and estimate the road load and grade based on the updated mass estimation.

3. The system of claim 2, wherein the controller is configured to update the estimated mass of the vehicle for a predetermined number of the plurality of accelerations and thereafter hold the updated mass estimation constant until the controller detects a triggering event indicative of a change in the mass of the vehicle.

4. The system of claim 3, wherein the triggering event includes receipt of signals indicative of at least one of a change in vehicle payload, disconnection of a trailer from the vehicle, and connection of a trailer to the vehicle.

5. The system of claim 1, wherein the controller is configured to select between at least a first shift schedule and a second shift schedule based on the characteristics of the terrain over which the vehicle is travelling, and wherein the characteristics of the terrain include a magnitude of a grade over which the vehicle has travelled within a predetermined distance.

6. The system of claim 1, wherein the controller is configured to select between at least a first shift schedule and a second shift schedule based on the functions capable of being performed by the vehicle, and wherein the functions capable of being performed by the vehicle include at least one of hauling a load, dumping a load, and hauling a trailer.

7. The system of claim 1, wherein the road load includes aerodynamic drag and rolling resistance associated with travel of the vehicle, and wherein the controller is configured to estimate the rolling resistance of the vehicle based on the estimated mass of the vehicle.

8. The system of claim 7, wherein the controller is configured to estimate the aerodynamic drag and the rolling resistance associated with travel of the vehicle during coasting events.

9. The system of claim 1, wherein the first shift schedule is a performance shift schedule, and the second shift schedule is an economy shift schedule, and wherein selection of the performance shift schedule results is the transmission holding a gear until an engine of the vehicle reaches a higher engine speed before shifting to a higher gear relative to the economy shift schedule.

10. A method of selecting shift schedules of a transmission of a vehicle configured to change gears according to two or more shift schedules, the method comprising:
    accelerating the vehicle from a standstill a plurality of times;
    estimating a mass of the vehicle based on the plurality of accelerations;
    estimating a road load of the vehicle based on the estimated mass of the vehicle;
    estimating a grade of terrain over which the vehicle is travelling based on the estimated mass of the vehicle; and
    selecting between at least a first shift schedule and a second shift schedule based on at least one of the estimated mass of the vehicle, characteristics of the terrain over which the vehicle is travelling, the estimated grade of the terrain over which the vehicle is travelling, and functions capable of being performed by the vehicle,
    wherein estimating the mass of the vehicle includes holding predetermined values of the road load and the grade constant, and determining the estimated mass during the plurality of accelerations.

11. The method of claim 10, further including updating the estimated mass of the vehicle by determining a running average of the estimated mass following each of the plurality of accelerations, and estimating the road load and grade based on the updated mass estimation.

12. The method of claim 11, wherein updating the estimated mass includes updating the estimated mass of the vehicle for a predetermined number of the plurality of accelerations and thereafter holding the updated mass estimation constant until a triggering event indicative of a change in the mass of the vehicle is detected.

13. The method of claim 12, wherein the triggering event includes receipt of signals indicative of at least one of a change in vehicle payload, disconnection of a trailer from the vehicle, and connection of a trailer to the vehicle.

14. The method of claim 10, wherein selecting between at least the first shift schedule and the second shift schedule is based on the characteristics of the terrain over which the vehicle is travelling, and wherein the characteristics of the terrain include a magnitude of a grade over which the vehicle has travelled within a predetermined distance.

15. The method of claim 10, wherein selecting between at least the first shift schedule and the second shift schedule is based on the functions capable of being performed by the vehicle, and wherein the functions capable of being performed by the vehicle include at least one of hauling a load, dumping a load, and hauling a trailer.

16. The method of claim 10, wherein estimating the road load includes estimating aerodynamic drag and rolling resistance associated with travel of the vehicle, and wherein estimating the aerodynamic drag occurs during coasting events.

17. A vehicle comprising:
    a chassis;
    an engine coupled to the chassis;
    a transmission coupled to the engine and configured to change gears according to two or more shift schedules; and
    a controller configured to:
        estimate a mass of the vehicle based on a plurality of accelerations of the vehicle from a standstill;
        estimate a road load of the vehicle based on the estimated mass of the vehicle;
        estimate a grade of terrain over which the vehicle is travelling based on the estimated mass of the vehicle; and
        select between at least a first shift schedule and a second shift schedule based on at least one of the estimated mass of the vehicle, characteristics of the terrain over which the vehicle is travelling, the estimated grade of the terrain over which the vehicle is travelling, and functions capable of being performed by the vehicle,
    wherein the controller is configured to estimate the mass of the vehicle using predetermined values of the road load and the grade by holding the predetermined values constant and determining the estimated mass during the plurality of accelerations.

18. The vehicle of claim 17, wherein the transmission is coupled to the engine via a torque converter, and wherein the controller is configured to estimate the mass of the vehicle based on signals indicative of the torque supplied to the transmission via the torque converter.

* * * * *

UNITED STATES PATENT AND TRADEMARK OFFICE
CERTIFICATE OF CORRECTION

| | | |
|---|---|---|
| PATENT NO. | : 9,014,931 B2 | Page 1 of 1 |
| APPLICATION NO. | : 13/720090 | |
| DATED | : April 21, 2015 | |
| INVENTOR(S) | : Palmer et al. | |

It is certified that error appears in the above-identified patent and that said Letters Patent is hereby corrected as shown below:

Title Page, Column 1, Item 73 (Assignee), line 1, delete "Caterpillar, Inc.," and insert
-- Caterpillar Inc., --.

Signed and Sealed this
First Day of March, 2016

Michelle K. Lee
*Director of the United States Patent and Trademark Office*